Nov. 24, 1959 L. E. LUDVIGSEN 2,914,262
POTENTIOMETER COIL WINDING MACHINE
Filed Feb. 11, 1955 6 Sheets-Sheet 2

INVENTOR.
LEONARD E. LUDVIGSEN
BY
*Theodore H. Lasagne*
ATTORNEY

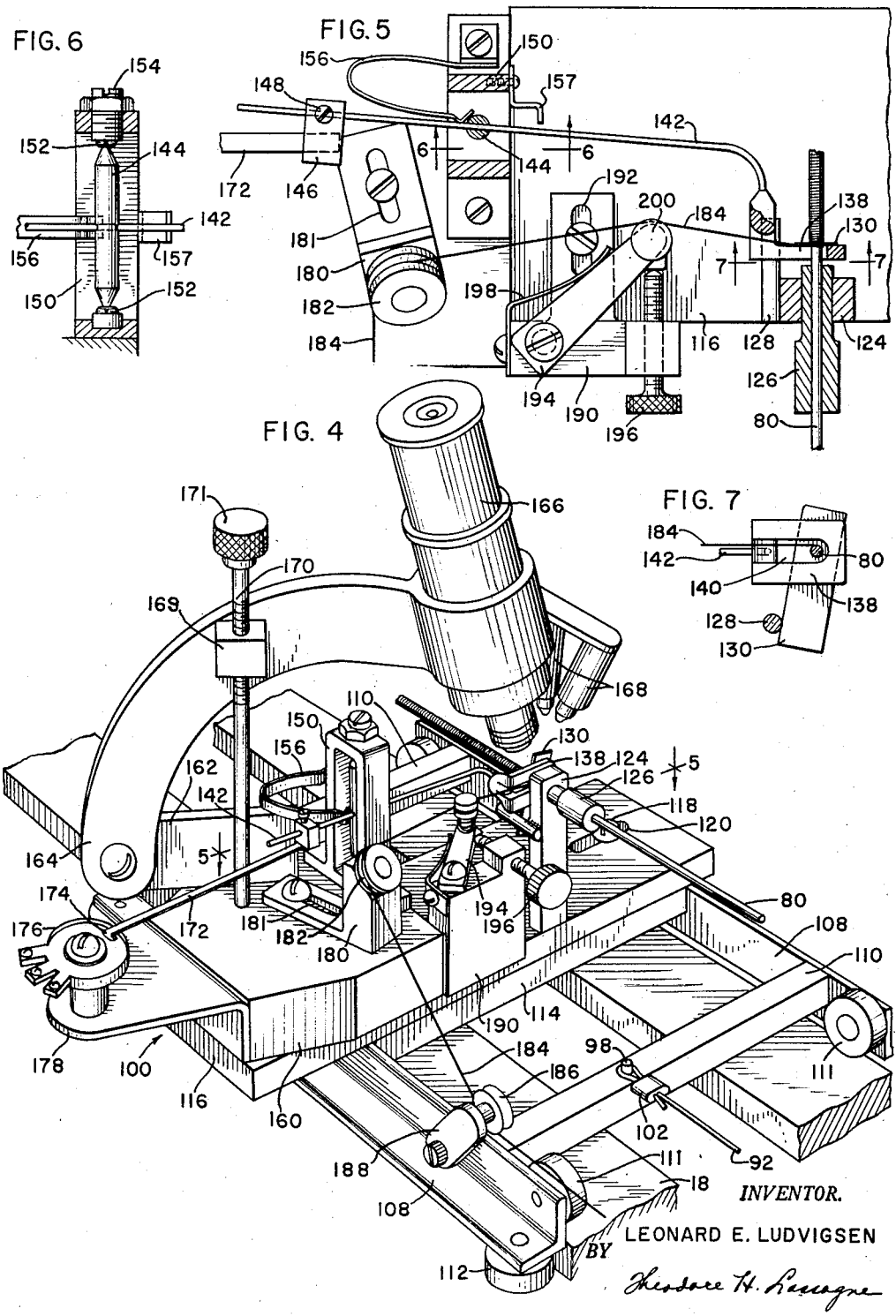

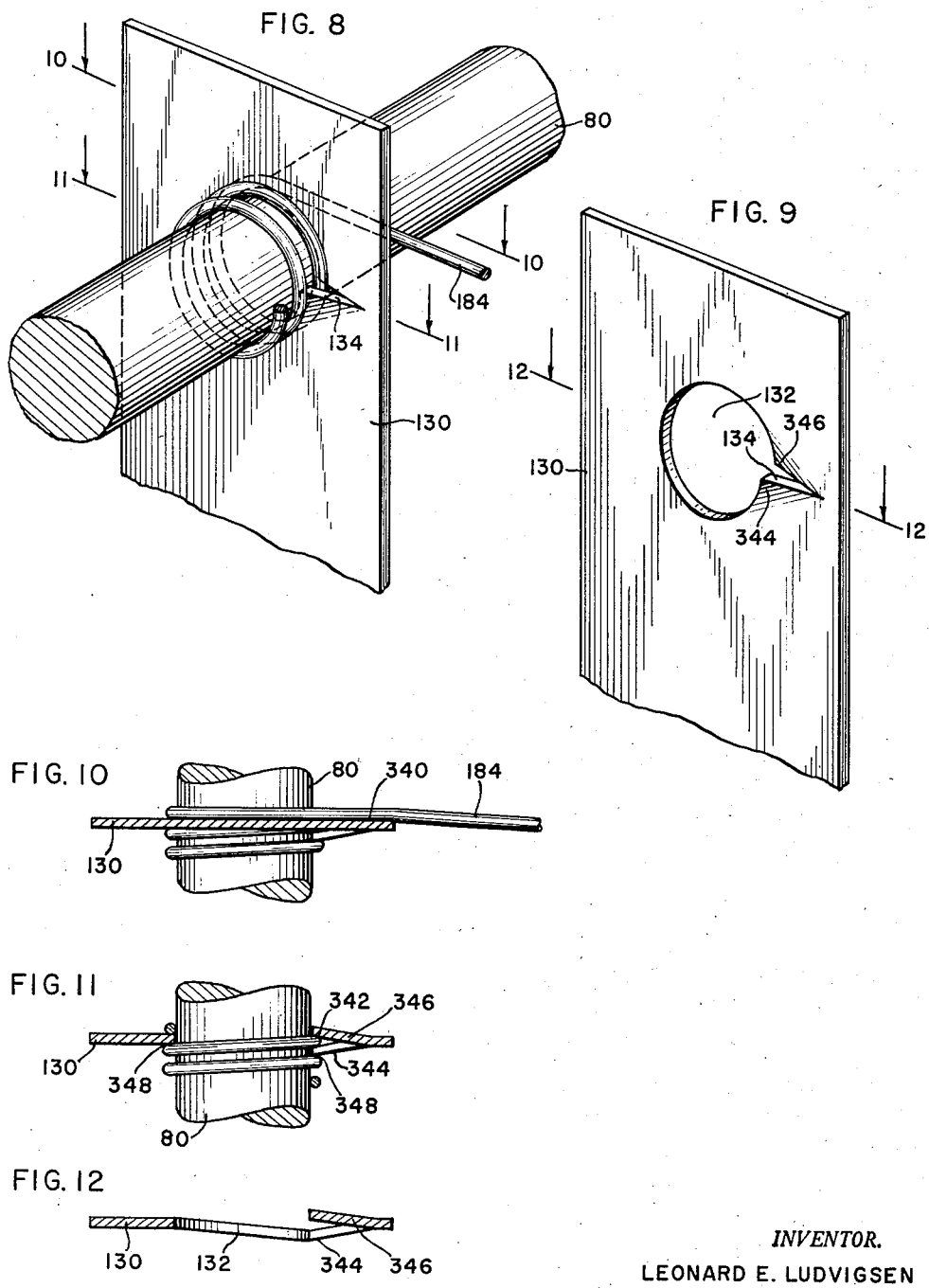

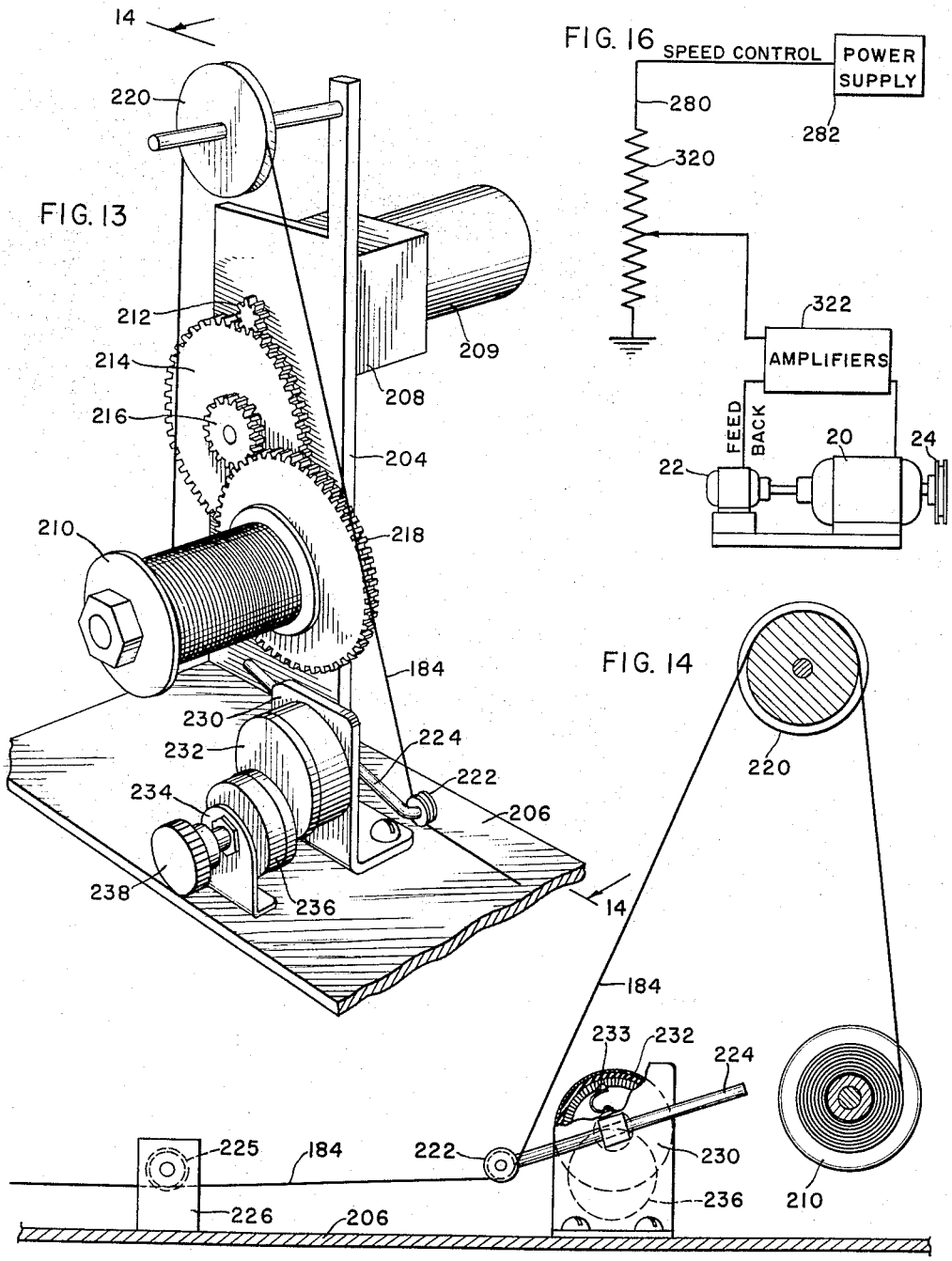
Nov. 24, 1959 — L. E. LUDVIGSEN — 2,914,262
POTENTIOMETER COIL WINDING MACHINE
Filed Feb. 11, 1955 — 6 Sheets-Sheet 5
INVENTOR.
LEONARD E. LUDVIGSEN
BY
ATTORNEY

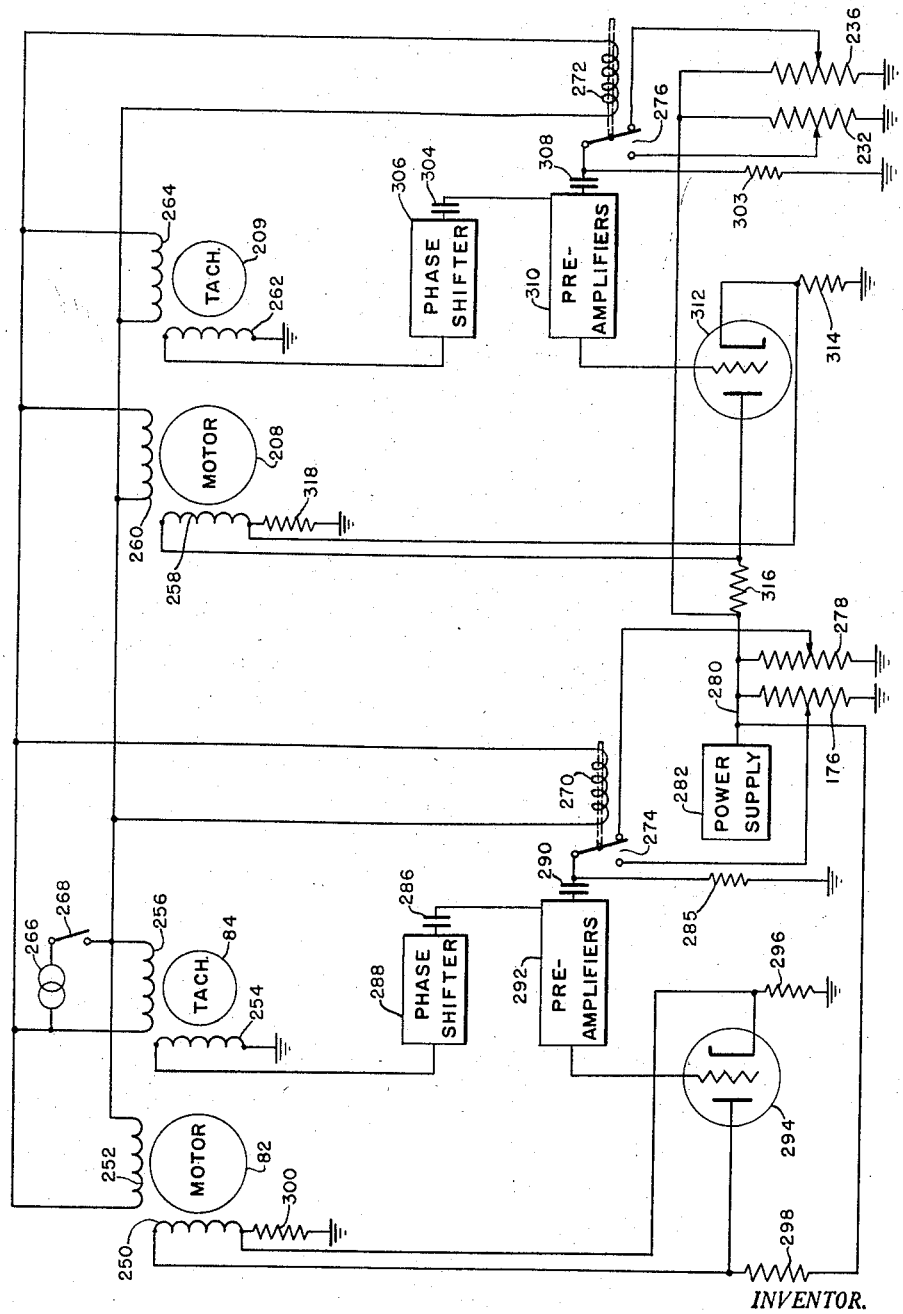

United States Patent Office 2,914,262
Patented Nov. 24, 1959

2,914,262

POTENTIOMETER COIL WINDING MACHINE

Leonard E. Ludvigsen, Montebello, Calif.

Application February 11, 1955, Serial No. 487,580

11 Claims. (Cl. 242—9)

This invention relates to winding machines and more particularly to a machine for winding a plurality of turns of a flexible material such as wire with uniform spacing on a mandrel. The invention also relates to methods of obtaining uniform spacing between the turns of wire on a mandrel.

Electronic circuits and systems have received wide acceptance in recent years for a large number of different uses. For example, electronic techniques have been recently adapted for use in computers. Electronic techniques are also becoming increasingly important in the field of industrial instrumentation to control the automatic production of different items. In these and other fields, generation of precise voltages is often required.

One type of component often used to produce an accurate and sensitive voltage is a precision potentiometer. This type of potentiometer is formed by a first wire of relatively great thickness to serve as a mandrel. A large number of turns of thin wire are then wound on the mandrel so that a relatively high value of resistance can be obtained in a small space. The mandrel is subsequently usually bent into the desired shape such as a circle or a helix to conserve space, and a wiper is provided for rotation around the mandrel. By rotating the wiper around the mandrel, the effective resistance presented by the potentiometer at the position of the wiper is gradually changed.

The precision potentiometers now in use have certain disadvantages. One disadvantage is that they are quite expensive. Another disadvantage is that, in spite of their cost, they present precise resistances only in comparison to the resistances presented by an ordinary potentiometer. Actually, errors up to 1% and more occur often between different "precision" potentiometers which are supposed to have identical characteristics. This has prevented the systems using the "precision potentiometer" from being as sensitive and reliable as might be desired.

This invention provides a machine for uniformly spacing a plurality of turns of wire on a mandrel to obtain a precision potentiometer. Potentiometers wound by the machine constituting this invention vary in resistance from a desired value by an error of 0.1% or less. The machine obtains this accuracy in part by maintaining a constant tension on the wire being wound on the mandrel. The machine also produces accurate precision potentiometers by imposing a force of constant value on the wire. Servomechanism techniques are included in the machine to insure that a uniform tension on the wire and a uniform force on the wire are being constantly maintained.

An object of this invention is to provide a machine for winding a plurality of turns of a flexible material such as wire with uniform spacing on a mandrel.

Another object is to provide a machine for producing precision potentiometers having variations in resistance considerably less than the "precision" potentiometers now being used.

A further object is to provide a machine which is capable of adjusting the spacing between turns of wire in accordance with the value of the resistance desired in the precision potentiometer being formed by the machine.

Still another object is to provide a machine which includes components such as servomechanisms for maintaining a substantially constant tension on the wire and for imposing a substantially constant force against the wire to insure that the turns of wire are uniformly spaced and are of equal tautness on the mandrel.

A still further object is to provide a method of uniformly spacing a plurality of turns of a flexible material such as wire on a mandrel.

Other objects and advantages will be apparent from a detailed description of the invention and from the appended drawings and claims.

In the drawings:

Figure 4 is an enlarged perspective view of certain features shown in Figures 1 and 2, as seen from a position above, in front of, and on the right side of the machine;

Figure 5 is an enlarged fragmentary plan view in section and is taken on substantially the line 5—5 of Figure 4;

Figure 6 is an enlarged fragmentary elevational view in section and is taken substantially on the line 6—6 of Figure 5;

Figure 7 is an enlarged fragmentary elevational view in section and is taken on substantially the line 7—7 of Figure 5;

Figure 8 is an enlarged fragmentary perspective view of certain components shown in Figures 2, 4 and 5 as seen from a position in front of, on the left side of, and slightly above the components;

Figure 9 is an enlarged fragmentary perspective view of one of the components shown in Figure 8 as seen from a position corresponding to that shown in Figure 8 and illustrates the appearance of the component in its operative relationship;

Figure 1:
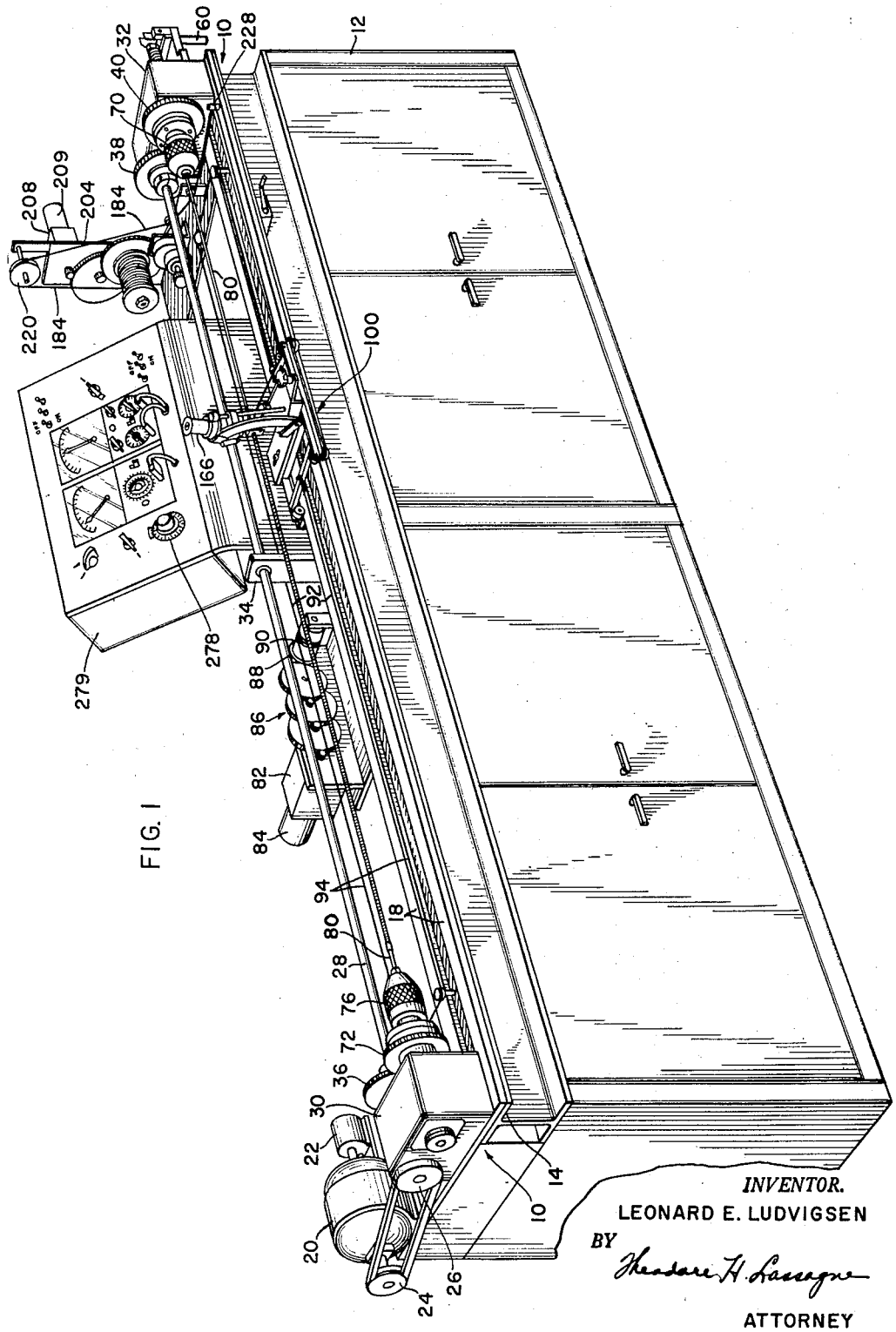
Figure 1 is a perspective view of a winding machine constituting one embodiment of this invention as seen from a position in front of, on the left side of, and slightly above the machine.
Figure 2:
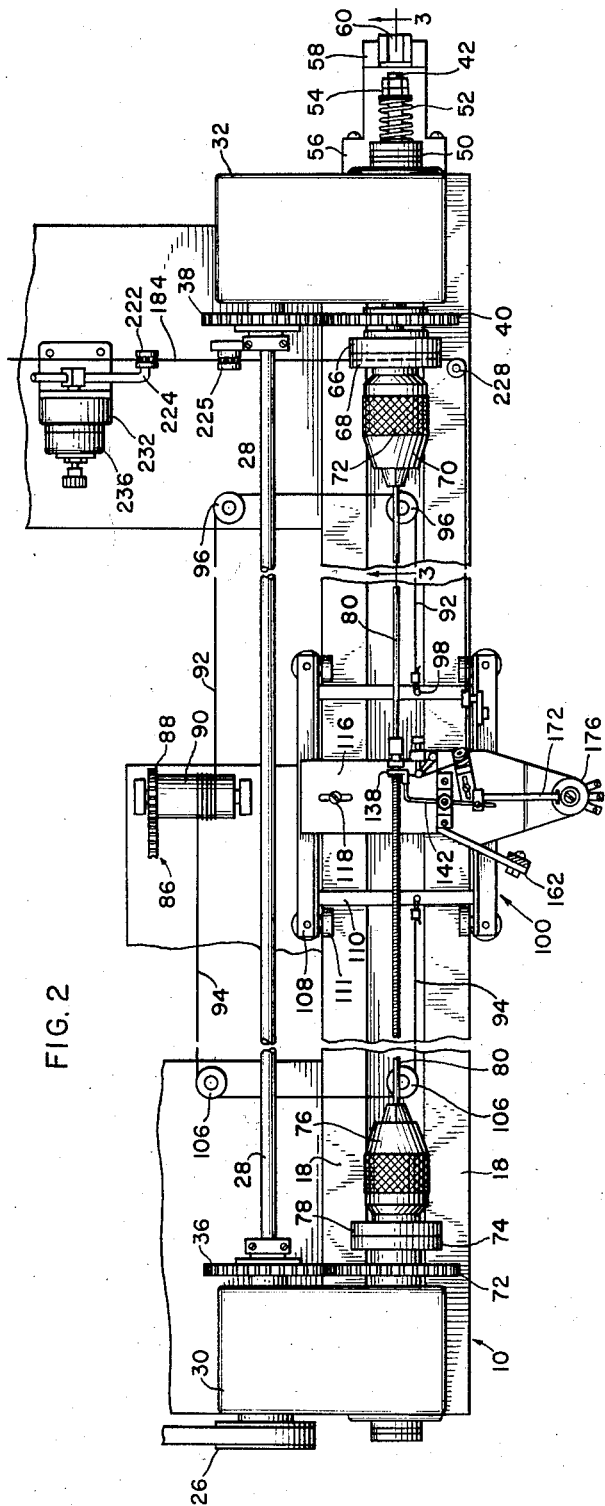
Figure 2 is an enlarged fragmentary top plan view of the machine shown in Figure 1.

Figures 10 and 11 are enlarged fragmentary sectional views taken substantially on the lines 10—10 and 11—11 of Figure 8 and schematically illustrate the manner in which turns of wire are wound on a mandrel;

Figure 12 is an enlarged sectional view substantially on the line 12—12 of Figure 9 and illustrates in further detail the operative relationship of the component shown in Figure 9;

Figure 13 is an enlarged fragmentary perspective view of certain components shown in Figures 1 and 2 for maintaining a substantially constant tension on the wire, these components being seen from a position in front of and on the left side of the machine;

Figure 14 is an enlarged fragmentary sectional view substantially on the line 14—14 of Figure 13 and illustrates in further detail the tensioning components shown in Figure 13;

Figure 15 is a view, partly in block form, somewhat schematically illustrating the relationship between certain mechanical features shown in the previous views and certain electrical features forming a part of the invention; and Figure 16 is a view, partly in block form, illustrating the relationship between other mechanical features shown in the previous views and certain electrical features forming a part of the invention.

In the embodiment of the invention shown in the drawings, a table generally indicated at 10 (Figures 1 and 2) extends from a base 12. The table 10 carries a plate support 14 extending horizontally along the table in a longitudinal direction. A pair of ways 18 is fixedly positioned on top of the support 14 to provide a carriage track.

A motor 20 (Figure 1) and a tachometer 22 are suitably supported on the table 10. The motor 20 may be a compound wound D.-C. motor adapted to rotate at a uniform speed. The tachometer is mechanically coupled to the motor and is adapted to introduce to the motor a signal having characteristics dependent upon the speed of the tachometer. The signal produced by the tachometer and introduced to the motor has characteristics for maintaining a uniform speed in the motor.

Figure 3:
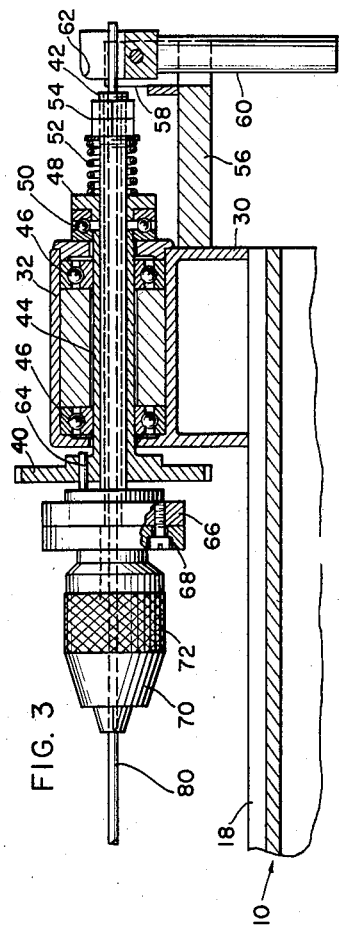
Figure 3 is an enlarged fragmentary sectional view substantially on the line 3—3 of Figure 2 and illustrates in further detail certain features included in the embodiment shown in Figures 1 and 2.

A pulley 24 is adapted to be directly driven by the motor 20 and is coupled as by a belt to an idler pulley 26 mounted on one end of an idler shaft 28. The shaft 28 is supported at opposite ends by pillow blocks 30 and 32 carried on the table 10 and at an intermediate position by an upright 34 extending from the table. A pair of identical gears 36 and 38 are also mounted on the idler shaft 28 at opposite ends of the shaft. The gear 38 is in mesh with a gear 40 (Figures 1, 2 and 3) mounted on a shaft 42 (Figure 3). The shaft 42 and a sleeve portion 44 on the gear 40 extend through the pillow block 32 and are rotatable on bearings 46 relative to the pillow block. The bearings 46 are disposed at opposite ends of the pillow block to impart stability to the rotary movement of the shaft.

A flange portion 48 is provided at the right end of the sleeve portion 44 at a position somewhat removed from the pillow block 32. A ball bearing assembly 50 is disposed between the flange portion 48 and the pillow block 32 to obtain a relative rotary movement between these members. A helical spring 52 is suported on the shaft 42 in constrained relationship between the flange portion 48 and nuts 54 threadably positioned on the shaft at the right end of the shaft.

An extension table 56 is supported by the pillow block 32 at the right end of the block. A pair of support arms 58 extend upwardly from the extension table 56 and support an actuating lever 60 in pivotable relationship to the arms. The lever 60 is provided at its upper forward edge with a curved surface 62 for imposing on the shaft 42 a force of gradually increasing intensity as the lever 60 is pivoted in a counterclockwise direction in Figure 3.

A pin 64 extends through an axial hole in the gear 40 and has a suitable attachment to a sleeve 66. As shown in Figure 3, the sleeve 66 is attached as by screws to a sleeve 68 forming a part of a chuck 70. The screws extend through enlarged holes (shown somewhat schematically in Figure 3) in the sleeve 68 so that the sleeve can be moved vertically or horizontally relative to the sleeve 66. In this way, the axis of rotation of the sleeve 68 and the chuck 70 can be adjusted relative to that of the sleeve 66. The clamping opening in the chuck is adjustable as by rotation of a knurled collar 72. The walls defining the clamping opening in the chuck 70 are precision ground to insure an accurate rotation of the member such as a mandrel being held in the chuck. A chuck having a precision-ground clamping opening may be obtained from the Empire Tool Company of New York as distributors for the Albrecht Company of Germany.

In like manner, the gear 36 is in mesh with a gear 72 similar in construction to the gear 40. The gear 72 is included in an assembly with the pillow block 30, a sleeve 74 and a chuck 76 in a manner similar to that described above. The chuck 76 is provided with a sleeve portion 78 having enlarged holes to obtain an adjustable positioning of the chuck relative to the sleeve 74. The chuck 76 may be similar in construction to the chuck 70.

A mandrel 80 extends on one side through the chuck 70, the sleeve 66, the gear 40 and the sleeve portion 44 integral with the gear. On the other side, the mandrel 80 extends through the chuck 76. The mandrel 80 is maintained in fixed position by the clamping action of the chucks 70 and 76 and is stretched taut by the action of the spring 52 against the flange portion 48 in a manner which will be described in detail hereinafter. When the machine constituting this invention is being used to form the winding of a precison potentiometer, the mandrel 80 may be a wire such as wire having a suitable peripheral insulation. The wire may have a suitable diameter such as in the range from 0.020 inch to 0.200 inch.

A servomotor 82 (Figure 1) and a tachometer 84 are suitably supported on the base 12. The servomotor 82 and tachometer 84 may be obtained as a set designated as Type FP49 by the Diehl Manufacturing Company of Philadelphia, Pennsylvania. A gear train generally indicated at 86 in Figure 1 is adapted to be driven by the motor 82. The gears in the train are preferably precision ground to minimize backlash and have a suitable reduction ratio such as a ratio of approximately 1100:1.

The gear train 86 drives a gear 88 suitably attached as by a shaft to a drum 90 (Figure 2). The drum 90 carries the ends 92 and 94 of a suitable cable, which may be made from a suitable material such as stainless steel wire rope having a suitable diameter such as approximately 0.050 inch. The end 92 of the cable extends from the drum 90 around a pair of pulleys 96 rotatable on the table 10 at the right end of the table. The end 92 of the cable is then looped around a peg 98 (Figure 4) on a carriage generally indicated at 100 and is clamped as at 102. In like manner, the end 94 of the cable extends from the drum 90 around a pair of pulleys 106 (Figure 2) rotatable on the table 10 at the left end of the table. The end 94 of the cable is then attached to the carriage 100 as by a peg and clamp similar to the peg 98 and the clamp 102.

The carriage 100 includes a pair of L-shaped guide rails 108 (Figure 4) fixedly positioned relative to each other as by cross bars 110. The guide rails 108 extend in a direction substantially parallel to the plate support 14 at positions laterally exterior to the channels. The vertical legs of the guide rails 108 support at their opposite ends rollers 111 rotatable on the upper surface of the ways 18. Rollers 112 are also supported by the guide rails 108 at the extremities of the guide rails and at intermediate positions in the guide rails, the rollers at the intermediate positions not being specifically shown. The rollers 112 are supported on the horizontal legs of the L-shaped guide rails. A pair of rollers (not shown) may also be supported by the guide rails 108 at an intermediate position along the rails for movement along the undersurface of the upper horizontal legs forming a part of the plate support 14.

A support plate 114 is supported by the guide rails 108 for movement with the guide rails. A platform 116 is in turn attached to the support plate 114 as by screws 118 extending through holes 120 in the platform for reception by threaded sockets (not shown) in the support plate. The holes 120 are enlarged so that the platform 116 may be adjusted laterally or pivotably relative to the support plate 114 before the screws 118 are tightened.

A post 124 (Figures 4 and 5) extends upwardly from the platform 116 at the rear end of the platform. The post 124 has at its upper end a hole which snugly receives a collar 126. The collar 126 is sufficiently long so that it extends through the hole in the post 124 to a position beyond the post at the left and right ends of the post. The collar 126 is in turn axially bored to obtain a passage of the mandrel 80 through the bore in a close fitting relationship.

A torque bar 128 (Figures 4, 5 and 7) is fastened as by welding to the post 124 at a position below the collar 126. The torque bar 128 extends horizontally to the left and contacts a pitch guide 130 (Figures 4, 5, 8 and 9) at a position towards the bottom of the guide. The pitch guide 130 may be a relatively thin flat plate having a thickness in the order of 0.0004 inch to 0.020 inch, depending upon the thickness of the wire being wound on the mandrel and the spacing desired between the turns of wire. The pitch guide 130 may be made from a suitable material such as tool steel or thin stock having good qualities of flexibility, hardness and durability.

At an upper position, the pitch guide 130 may be provided with a hole 132 (Figures 8 and 9) having a diameter slightly greater than that of the mandrel 80 so that the mandrel can extend in snug relationship through the hole. A slot 134 is also formed in the pitch guide 130. The slot 134 extends horizontally from the periphery of the hole 132 for a distance of approximately 3/32 or 1/8 inch. The slot 134 is disposed along the rearward extension of a radial line horizontally bisecting the hole 132.

A sensing shoe 138 (Figures 4, 5 and 7) is positioned between the pitch guide 130 and the collar 126. The sensing shoe 138 has a pair of substantially perpendicular arms and also has a slot 140 extending through both of the arms without interrupting the peripheral continuity of the shoe. The vertical dimension of the slot 140 is sufficiently large so that the mandrel 80 may extend through the slot in a loose relationship.

A rod 142 (Figures 5, 6 and 7) is fastened at one end to the sensing shoe 138. The rod extends through a hole in a pivot pin 144 (Figures 5 and 6) at an intermediate position and at its other end extends through a hole in a coupling member 146 (Figure 5) made from a suitable material having good properties of electrical insulation. The rod 142 is adjustably positioned in the coupling member 146 as by a screw 148 extending into the member.

The pin 144 is vertically supported in a bearing block 150 and is pivotable on bearings 152 (Figure 6) forming a part of the bearing block. The bearings 152 may be jeweled to enhance the sensitivity of pivotable response of the pin 144. The pressure exerted by the bearings 152 on the pin 144 may be adjusted by disposing the upper bearing 152 at the tip of a screw 154 extending through a threaded socket in the bearing block 150. A leaf spring 156 (Figures 4, 5 and 6) is attached at one end to the bearing block 150. At its other end, the leaf spring 156 is disposed in constrained relationship against the rod 142 at a position contiguous to the pivot pin 144. A stop 157 is also attached to the bearing block 150 and is disposed in relatively close relationship to the rod 142.

The bearing block 150 is attached as by screws to a pedestal 160 (Figure 4) which is fixedly supported on the platform 116 at a position near the front of the platform. A support bar 162 extends upwardly from the pedestal 160 and holds as by a nut-and-screw combination an arched bracket 164 such that the bracket can be pivoted in a vertical plane relative to the support bar.

At its pivoting end, the bracket 164 carries a microscope 166 and pair of lights 168. At an intermediate position, the bracket has a boss 169 with a tapped socket for receiving the threaded portion of an adjusting rod 170. At its bottom end the rod 170 contacts the pedestal 160, and at its top end the rod 170 has a knurled knob 171 for manual gripping. By turning the rod 170, the bracket 164 can be pivoted to bring the microscope 166 in line with the mandrel 80 and the pitch guide 130. In this way, an operator or inspector can see in magnified form the turns of wire being wound on the mandrel 80.

The coupling member 146 (Figure 5) not only holds the rod 142 but also supports one end of a pivotable arm 172 (Figures 4 and 5). At its other end, the arm 172 carries a contact 174 which engages the turns of wire on a potentiometer 176 (Figure 4). The arm 172 is made from an electrically conductive material and is connected as by a lead to the middle one of the three terminals extending from the potentiometer. For reasons which will be disclosed in detail hereinafter, the potentiometer is a precision potentiometer which is preferably wound on the machine constituting this invention so as to insure its high accuracy. The potentiometer 176 is suitably supported on a bracket 178, which is in turn fastened to the pedestal 160.

A support post 180 (Figures 4 and 5) is attached to the pedestal 160 as by a screw and is adjustably positioned on the pedestal by providing it with an elongated slot 181. The post 180 has an inclined surface which holds a pulley 182 adapted to receive a wire 184 and to lead the wire towards the mandrel 80. The wire 184 passes to the pulley 182 from a pulley 186 (Figure 4). The pulley 186 is supported by a linkage 188 in pivotable relationship to the table 10 at a position slightly above the table.

A stanchion 190 (Figures 4 and 5) is secured to the platform 116 as by a screw at a position to the rear of the support post 180. The screw extends through an elongated hole 192 (Figure 5) in the stanchion 190 so that the stanchion can be adjusted in position relative to the platform 116. A positioning arm 194 is attached as by a screw to the top of the stanchion 190 and is pivotable relative to the stanchion as by a lead screw 196 extending through a flange portion on the stanchion. The positioning arm 194 is pressed against the lead screw 196 by a leaf spring 198 suitably attached at one end to the stanchion 190. The positioning arm 194 carries at its free end a pulley 200 adapted to receive the wire 184 from the pulley 182 and to introduce the wire to the mandrel 80.

Apparatus for regulating the tension of the wire 184 is shown in Figures 1, 13 and 14. This apparatus includes a stanchion 204 extending upwardly from a support plate 206 (Figures 13 and 14) suitably attached to table 10 at the right end of the table. The stanchion 204 supports a servomotor 208 and a tachometer 209. The motor 208 is adapted to drive a spool 210 through a gear train including gears 212, 214, 216 and 218, the gear 218 being mounted on the same shaft as the spool 210. The wire 184 is adapted to become unwound from the spool 210 as the motor 208 rotates.

The wire from the spool 210 passes over a pulley 220 loosely supported for rotation on a peg extending from the top of the stanchion 204. The wire 184 then passes downwardly and forwardly to a pulley 222 carried for rotation at the end of a pivotable arm 224. After being guided by the pulley 222, the wire is led forwardly to a pulley 225 mounted for rotation on a bracket 226 suitably attached to the support plate 226. From the pulley 225, the wire passes to a stud 228 (Figure 1), which directs the wire to the pulley 186 shown in Figure 4.

The arm 224 is pivotably mounted on a bracket 230 suitably secured as by screws to the support plate 206. A precision potentiometer 232 is also mounted on the bracket 230 and is provided with a movable contact 233 which is rotatable in accordance with the pivotable movements of the arm 224. The potentiometer 232 is preferably manufactured by the machine constituting this invention so as to have an accurate value. The support plate 206 also supports a bracket 234, which in turn carries a reference potentiometer 236. The potentiometer 236 is preferably of the precision type and has a manually adjustable knob 238 for controlling the positioning of a movable contact in the potentiometer.

The motors 82 (Figure 1) and 208, the tachometers 84 and 209 and the potentiometers 176 (Figure 4), 232 (Figures 1 and 14) and 236 are included in the electrical circuit shown in Figure 15. The motor 82 is shown in Figure 15 as having a pair of field coils 250 and 252. Similarly, the tachometer 84, the motor 208 and the tachometer 209 are respectively provided with pairs of coils 254 and 256, coils 258 and 260 and coils 262 and 264. The coils in each pair are disposed in substantially perpendicular relationship to each other.

The coils 252, 256, 260 and 264 are connected in parallel such that one terminal of each coil has a common connection with a suitable source 266 of alternating voltage and the other terminal of each coil has a common connection with the stationary contact of a master switch 268. The movable contact of the switch 268 is connected to the source 266 of alternating voltage to form a completed electrical circuit when the switch 268 is closed. Coils 270 and 272 are also in parallel with the coils 252, 256, 260 and 264. The coils 270 and 272 respectively operate in conjunction with switches 274 and 276 to form vibrators for converting direct voltages into alternating voltages.

As shown in Figure 15, the left stationary contact of the switch 274 is connected to the movable contact of the potentiometer 176 and the right stationary contact of the switch 274 is connected to the movable contact of a reference potentiometer 278. The potentiometer 278 is mounted on a control panel 279 in Figure 1 and the movable contact of the potentiometer is manually adjustable for reasons which will be disclosed in detail hereinafter. First stationary contacts of the potentiometers 176 and 278 are grounded and second stationary contacts of the potentiometers are adapted to receive a positive direct potential through a line 280 from a power supply 282. The power supply 282 is adapted to provide a regulated and substantially constant potential on the line 280.

The movable contact of the switch 274 is connected to one terminal of a resistance 285 having its other terminal grounded. The movable contact of the switch 274 is connected to the resistance 285 to prevent the movable contact from having a floating potential during the operation of the apparatus constituting this invention. As will be described in detail hereinafter, the movable contact of the switch 274 is adapted to receive on a cyclic basis the voltages on the left and right stationary contacts of the switch.

The voltage on the movable contact of the switch 274 passes through a coupling capacitance 290 to preamplifier stages 292 which may be of a conventional design. Signals from a phase shifter 288 also pass through a coupling capacitance 286 to the pre-amplifiers 292. The phase shifter 288 may be formed from a combination of resistances, inductances and capacitances in a conventional manner. Voltage is applied to the phase shifter 288 from one terminal of the winding 254 in the tachometer 84. The other terminal of the winding 254 is grounded.

The output from the preamplifiers 292 is in turn introduced to the grid of a tube 294. The cathode of the tube 294 is connected to a grounded resistance 296 and the plate of the tube is connected through a resistance 298 to the line 280. The resistances 296 and 298 have equal values. The voltages on the cathode and plate of the tube 294 are applied to the terminals of the winding 250 in the motor 82. One of the terminals in the winding 250 not only has a common connection with the cathode of the tube 294 but also with a grounded resistance 300.

In like manner, the stationary contacts of the switch 276 are connected to the movable contacts of the potentiometers 232 and 236. First stationary contacts of the potentiometers 232 and 236 are grounded and second stationary contacts of the potentiometers have voltages applied to them from the line 280. The movable contact of the switch 276 is connected to the ungrounded terminal of a grounded resistance 303 corresponding in value and function to the resistance 285.

The voltage on the movable contact of the switch 276 passes through a coupling capacitance 308 to preamplifier stages 310 corresponding to the preamplifiers 292. Signals also pass to the preamplifier stages 310 through a coupling capacitance 304 from a phase shifter 306 corresponding to the phase shifter 288. The input terminal of the phase shifter 306 is connected to one terminal of the winding 262 in the tachometer 209, the other terminal in the winding being grounded.

The output from the preamplifiers 310 are introduced to the grid of a tube 312 having its cathode connected to a grounded resistance 314 and its plate connected through a resistance 316 to the line 280. The resistances 314 and 316 correspond in value to the resistances 296 and 298. Connections are also made from the plate of the tube 312 to the two terminals of the winding 258. One of the terminals in the winding 258 is connected to a grounded resistance 318 as well as to the cathode of the tube 312. The resistance 318 corresponds in value to the resistance 300.

In Figure 16, a somewhat schematic circuit is shown for controlling the speed of the motor 20. The circuit includes a potentiometer 320 having stationary contacts connected to ground and to the line 280. The potentiometer 320 also has a movable contact which is manually adjustable in position and which is connected to an input terminal of amplifier stages 322. Voltage is also applied to another input terminal of the amplifier stages 322 from the tachometer 22 also shown in Figure 1. The output from the amplifier 322 is introduced to one of the field windings (not shown) in the motor 20 to regulate the speed of the motor by controlling the excitation of the field winding.

As an initial step, the switch 268 (Figure 15) is closed and the motor 20 is then operated to drive the drum 90 in a counterclockwise direction as seen in Figures 1 and 2. As the drum 90 rotates in this direction, the end 92 of the cable becomes wound on the drum and the end 94 of the cable becomes unwound a corresponding amount from the drum. This process of winding one end of the cable and unwinding the other end of the cable produces a controlled movement of the carriage 100 (Figure 4) along the table 10. When the drum 90 rotates in a clockwise direction, it causes the carriage 100 to return to a position at the left end of the table 10.

Various members are next adjusted in value in accordance with the spacing desired between successive turns of the wire 184 on the mandrel 80. For example, the speed of the motor 20 (Figure 1) may be adjusted by varying the position of the movable contact on the potentiometer 320 (Figure 16). This causes corresponding variations to be produced in the voltage introduced to the amplifier 322 and from the amplifier to the motor 20. The speed of the motor 20 is adjusted in accordance with such factors as the thickness of the wire 184 to be wound on the mandrel 80 and the spacing between successive turns on the mandrel.

The movable contact of the potentiometer 236 (Figures 14 and 15) is also adjusted in accordance with the value of the tension desired for the wire 184. The movable contact of the potentiometer 278 is also adjusted in position is accordance with the spacing which is desired between successive turns of the wire 184 on the mandrel 80. The operation of the potentiometers 236 and 278 will be disclosed in detail hereinafter.

The mandrel 80 is first inserted through the central openings in the chuck 76 (Figures 1 and 2), and the sleeve portion 78, the sleeve 74, the gear 72 and the sleeve portion on the gear, and the chuck 76 is then tightened to hold the mandrel in fixed position. The mandrel 80 is next inserted through the openings in the chuck 70, the sleeves 68 and 66, the gear 40 and the sleeve 44 on the gear. The lever 60 is subsequently pivoted in a counterclockwise direction as seen in Figure 3. This causes the curved surface 62 on the lever 60 to impose a gradually increasing force on the shaft 42 to move the shaft to the left in Figure 3 against the action of the spring 52. The chuck 70 is then tightened on the mandrel 80 and the lever 60 is pivoted in a clockwise direction back into a vertical position. When this occurs, the spring is free to impose a tensioning force between the nuts 54 and the flange portion 48 on the gear 40. This tensioning force acts to stretch the mandrel 80 taut.

After the mandrel 80 has been fastened between the chucks in taut relationship, the wire 184 is properly positioned. The wire 184 is led over the pulley 220 and around the pulleys 222 (Figures 13 and 14) and 225, the stud 228 (Figures 1 and 2), the pulleys 186 (Figure 4) and 182, the pulley 200 and through the slot 140 in the sensing shoe 138 and the slot 134 (Figure 9) in the pitch guide 130. The wire 134 is then fastened as by tape (not shown) to the mandrel 80 at the left end of the mandrel.

The motor 20 is operated to rotate the mandrel 80 at a substantially constant speed. As the mandrel 80 rotates, it winds the wire 184 on the mandrel. The wire 184 is made available for winding on the mandrel by the operation of the motor 208 in rotating the spool 210 to withdraw the wire from the spool. Successive turns of wire are wound in a helix having a pitch toward the right in Figures 1 and 2 because of the operation of the motor 82 in driving the carriage 100 toward the right.

As the wire 184 approaches the mandrel 80 from the pulleys 182 and 200, it passes through the slot 140 in the sensing shoe 138 and presses against the right face of the pitch guide 130. This may be seen at 340 in Figure 10. The wire 184 presses against the right face of the pitch guide 130 since it moves from the spool 200 toward the pitch guide in a direction slightly inclined to the right, as may be seen in Figure 5. The wire 184 presses against the rear face of the pitch guide 130 for approximately one-half of a turn of winding. Since the wire presses against the right face of the pitch guide 130, this face operates to provide an initial control over the positioning of successive turns of wire being wound on the mandrel.

After the initial half turn, the wire 184 follows the operative contour of the pitch guide 130 and passes through the slot 134 in the pitch guide. This is best seen in Figure 11 and is illustrated at 342 in that figure. The wire 184 is able to pass through the slot 134 in the pitch guide 130 since the pitch guide 130 is flexed to the left at positions 344 (best seen in Figures 9 and 12) below the slot 134 in relation to its disposition at positions 346 above the slot. The pitch guide 130 is flexed at positions contiguous to the slot 134 because of the force exerted against the pitch guide by the wire 184 as it extends through the slot. The passage of the wire 184 through the slot 134 occurs at a position approximately one turn after the wire 184 first reaches the mandrel 80.

The wire 184 continues from its position in the slot 134 and presses against the left face of the pitch guide 130. This is illustrated at 348 in Figure 11. This occurs through a distance of approximately one turn of wire from the position of the wire in the slot 134. Since the wire 184 is disposed at one turn on the right side of the pitch guide 130 and at the next turn is disposed on the left side of the pitch guide, the thickness of the pitch guide controls the minimum spacing between turns. By using pitch guides having a thickness of as little as 0.0004 inch, the spacing between adjacent turns of wire can be made quite small. The operation of the wire 184 in passing from the right face of the pitch guide 130 through the slot 134 to the left face of the pitch guide provides a second control over the spacing between adjacent turns on the mandrel. As a result of this operation, a sensitive control is exerted on the wire to make uniform the spacing between turns of wire.

As described above, a force is exerted against the wire 184 by the pitch guide 130 to constrain the wire. This constraining force operates in part to maintain a uniform spacing between the turns of wire in a manner similar to that described above. The force also operates in part to control the exact spacing between successive turns—in other words, whether the turns will be tightly packed or loosely separated. By adjusting the spacing between turns, the number of turns wound on a mandrel of a particular length can be varied to produce corresponding variations in the total resistivity of the wire on the mandrel.

The constraining force exerted by the pitch guide 130 against the wire 184 is dependent upon certain factors. One of the factors is the angle which the wire 184 makes with the pitch guide 130 as the wire approaches the pitch guide from the pulley 200. This angle may be adjusted on a coarse basis by moving the stanchion 190 along the platform 116 and then tightening the screw holding the stanchion against the platform. The stanchion 190 can be adjusted in positioning relative to the platform 116 because of the elongated slot 192.

In addition to the coarse control provided by the adjustable positioning of the stanchion 190, a sensitive control is also provided over the angle at which the wire 184 approaches the pitch guide 130. This sensitive control is provided by the adjustable positioning of the lead screw 196 in the threaded socket of the stanchion 190. As the lead screw 196 is rotated for movement into the stanchion 190, it pivots the positioning arm 194 in a counterclockwise direction in Figures 4 and 5. The arm 194 is pivoted against the action of the leaf spring 198, which presses the arm against the lead screw 196. The pivotal movement of the arm 194 in a counterclockwise direction causes the angle between the wire 184 and the pitch guide 130 to be increased. Similarly, pivotal movement of the arm 194 in a clockwise direction produces a decrease in the angle between the wire 184 and the pitch guide 130.

When the angle between the wire 184 and the pitch guide 130 is relatively large, the constraining force exerted by the pitch guide against the wire is correspondingly relatively large. This large constraining force acts against the wire 184 to produce a relatively narrow spacing between successive turns of wire. In like manner, a relatively shallow angle between the wire 184 and the pitch guide 130 causes the constraining force exerted by the pitch guide against the wire to be relatively small. Since the constraining force is small, the spacing between successive turns of wire becomes relatively large.

Another factor in controlling the spacing between successive turns of wire on the mandrel 80 is the force exerted by the sensing shoe 138 against the pitch guide 130. This force is transmitted by the pitch guide against the wire. The force is produced by the action of the leaf spring 156 in pressing against the rod 142 and in pivoting the rod in a counterclockwise direction in Figure 5. The pivotal movement of the rod 142 is limited in one direction by the collar 126 and in the other direction by the stop 157. As the rod 142 pivots on the pin 144, it carries the coupling member 146 with it. The coupling member 146 in turn carries the arm 172 and produces a corresponding pivotal movement of the arm and the contact 174 on the end of the arm. This causes the voltage at the movable contact of the potentiometer 176 (Figures 4 and 15) to be correspondingly varied.

The voltage on the movable contact of the potentiometer 176 is introduced to the left stationary contact of the switch 274 (Figure 15). Ordinarily, the movable contact of the switch 274 is positioned against the left stationary contact because of spring-loading provided in the switch. However, during the positive half of each cycle of alternating voltage introduced to the winding 270, magnetic flux is produced in the winding for attracting the movable contact of the switch 274 into engagement with the right stationary contact. During the negative half of each cycle of alternating voltage, the spring-loading in the switch 274 causes the movable contact to return into engagement with the left stationary contact.

As the movable contact of the switch 274 vibrates between the left and right stationary contacts, it produces a signal dependent upon the voltages on the contacts. When the voltages on the left and right stationary contacts of the switch 274 have the same polarity and equal magnitudes, a direct voltage is produced on the movable contact of the switch. This voltage is unable to pass to the preamplifiers 292 because of the blocking action of the coupling capacitance 290.

Unequal voltages on the left and right stationary contacts of the switch 274 cause an alternating voltage to be produced on the movable contact of the switch as it vibrates between the stationary contacts. This alternating voltage has an amplitude equal to substantially one half of the difference in amplitude of the voltages on the left and right stationary contacts. The alternating voltage has one polarity when the voltage on the left stationary contact is greater than that on the right stationary contact. The alternating voltage has the opposite polarity when the voltage on the left stationary contact of the switch 274 is less than that on the right stationary contact.

The alternating voltage produced on the movable contact of the switch 274 is amplified by the preamplifiers 292 and at the same time may be converted from a square wave into a substantially sinusoidal signal. This signal is introduced to the grid of the tube 294 to produce corresponding variations in the flow of current through the tube. These variations in the flow of current produce corresponding variations on the cathode of the tube because of the voltage drop across the resistance 296. Opposite variations in voltage are produced on the plate of the tube 294 because of the drop in potential across the resistance 298. In this way, the alternating voltage on the plate and cathode of the tube 294 are combined to produce a relatively large alternating voltage across the winding 250. The resultant excitation of the winding 250 and the excitation of the winding 252 combine to produce a change in the speed of the motor 82. The speed of the motor 82 changes in a direction to reduce the amplitude of the alternating voltage on the movable contact of the switch 274.

The speed at which the motor 82 rotates is dependent in part upon the positioning of the movable contact on the potentiometer 278. This results from the fact that an adjustment in the positioning of the movable contact on the potentiometer 278 causes a corresponding adjustment of voltage to be produced on the right stationary contact of the switch 274. This voltage then controls the speed of the motor 82 by controlling the level at which alternating voltages start to be produced on the movable contact of the switch 274.

When the constraining force exerted by the sensing shoe 138 against the pitch guide 130 is different than the value desired, a voltage having an amplitude different than the reference voltage on the movable contact of the potentiometer 278 is introduced to the left stationary contact of the switch 274. A resultant alternating voltage is produced on the movable contact of the switch 274 and can be considered as an error signal. This alternating voltage produces a corresponding change in the speed of the motor 82 as disclosed above.

A change in the speed of the motor 82 produces a corresponding change in the rate at which the carriage 100 moves along the table 10. Since the wire 184 is being made available at a substantially constant rate, variations in the speed of the carriage 100 produce changes in the constraining force exerted by the sensing shoe 138 through the pitch guide 130 against the wire. The changes in the constraining force are in a direction to return the voltage on the movable contact of the potentiometer 176 to a value equal to the voltage on the movable contact of the potentiometer 278. In this way, the constraining force on the wire 184 is maintained substantially constant to produce a uniform spacing between turns. This spacing is controlled in large part by the manually adjustable positioning of the movable contact on the potentiometer 278.

Sine the tachometer 84 is mechanically coupled to the motor 82, its speed varies with that of the motor. As the speed of the tachometer 84 varies, the signal produced across the winding 254 varies accordingly. This signal is shifted in phase by the phase shifter 288 and is introduced through the coupling capacitance 286 to the pre-amplifiers 292. The signal is then amplified and shaped to control the speed of the motor 82. By properly shifting the phase of the signal from the tachometer winding 254, the signal is able to provide a damping action on the motor 82 in preventing the motor from overshooting when its speed has to be changed.

Certain other components operate to enhance the uniformity with which the turns of wire are wound on the mandrel 80. For example, the post 124 (Figures 4 and 5) and the collar 126 operate to provide a nodal point at an intermediate position along the mandrel 80. This nodal point is provided at a position adjacent the position at which the wire is being wound on the mandrel. By providing the nodal point, the mandrel is prevented from vibrating at the position receiving the wire. The mandrel 80 might otherwise vibrate at this position because of the force exerted by the wire 184 as it is being wound on the mandrel. Preventing the mandrel 80 from vibrating is desirable to control the manner in which the wire 184 is wound on the mandrel.

The torque bar 128 also operates to enhance the uniformity of spacing between successive turns of wire on the mandrel 80. This results from the fact that the torque bar 128 prevents the pitch guide 130 from rotating as the mandrel 80 turns. The pitch guide 130 would otherwise tend to turn with the mandrel 80 because of the close fit of the mandrel in the hole 132 in the pitch guide. Since the pitch guide 130 is unable to turn, the slot 134 in the pitch guide is maintained in an optimum position for receiving the turns of wire as they are being wound.

Apparatus is also provided for regulating the tension of the wire 184 at a substantially uniform value. This value may be controlled by manually rotating the knob 238 in Figure 13 to adjust the positioning of the movable contact of the potentiometer 236. The resultant voltage on the movable contact of the potentiometer 236 is introduced to the left stationary contact of the switch 276.

The wire 184 from the spool 210 passes over the pulley 220, which operates to introduce the wire at a substantially constant angle to the pulley 222 regardless of the different positioning of the wire in the spool. As the wire 184 passes around the pulley 222, it exerts a force against the pulley, the magnitude of the force being dependent upon the tension of the wire. The force exerted against the pulley 222 produces a pivotal movement of the arm 224 and a corresponding variation in the positioning of the movable contact 233 (Figure 14) in the potentiometer 232. A resultant variation in voltage is produced on the movable contact 233 for introduction to the left stationary contact of the switch 276 in Figure 15.

When the tension of the wire 184 is not at the desired value, the pivotable disposition of the arm 224 and the movable contact 233 causes the voltage on the movable contact to be different from the reference voltage on the movable contact of the potentiometer 236. Because of this difference in voltages, an alternating voltage is produced on the movable contact of the switch 276 as the movable contact is vibrated. This alternating voltage is produced in a manner similar to that described above and can be considered as an error signal. The alternating signal is amplified and shaped by the pre-amplifiers 310 (Figure 15) and the amplifier including the tube 312. The voltage is then introduced to the winding 258 in the motor 208 to produce an adjustment in the speed of the motor.

By producing a change in the speed of the motor 208, the spool 210 is driven at a different rate and the wire becomes unwound from the spool at an adjusted rate. Since the wire is becoming available at an adjusted rate, its tension becomes changed to the proper value. This causes the arm 224 in Figures 13 and 14 to become pivotably adjusted in positioning since the tension of the wire 184 controls the positioning of the arm. The arm becomes pivotally adjusted to a position where the voltage of the movable contact of the potentiometer 232 is substantially equal to the voltage on the movable contact of the potentiometer 236.

After the desired number of turns of the wire 184 have been wound on the mandrel 80, the right end of the wire is secured to the mandrel as by a piece of tape (not shown). A glue made from a suitable material such as a plastic resin is then applied to the mandrel and to the turns of wire on the mandrel so as to hold the turns of wire in fixed position on the mandrel. This may be performed by dipping the mandrel into the glue. When the turns of wire have become fixedly positioned on the mandrel, the pieces of tape at the ends of the wire are removed.

The mandrel 80 and the turns of wire on the mandrel may be used for a precision potentiometer or for other purposes. As previously described, the mandrel 80 may be a flexible wire when the mandrel is to form part of a precision potentiometer. Since the mandrel 80 is flexible, it is bent into a suitable shape such as a circular or helical shape. Stationary contacts are attached to opposite ends of the wire 184 to obtain the full value of the resistance in the wire. A wiper is then disposed in rotatable relationship to the mandrel to contact successive turns of the wire 184 as it rotates. In this way, the resistance between the movable contact and one of the stationary contacts can be varied.

The apparatus described above has several important advantages. It includes components for maintaining substantially constant the constraining force exerted against the wire being wound on a mandrel. These components include electrical and mechanical features forming a servomechanism loop. The apparatus constituting this invention also includes components for maintaining substantially constant the tension of the wire being wound on the mandrel. These components are also disposed in a servomechanism loop.

By regulating the tension of the wire and the constraining force exerted on the wire, the spacing between successive turns of wire on the mandrel can be maintained uniform. In this way, precision potentiometers can be produced with variations in resistivity of only 0.025% or less as an average value for corresponding angular displacements between different resistances.

It should be appreciated that the motor 20 in Figure 1 also produces an effective control over the operation of the different servomechanism loops. The motor 20 provides such an effective control since it controls the rate at which the mandrel 80 turns. This in turn affects the tension on the wire 184 and the force exerted against the wire by such components as the pitch guide 130. Since the tension on the wire and the force exerted against the wire are controlled by the servomechanism loops, the operation of the loops can be considerably varied by adjustments in the operation of the motor 20.

What is claimed is:

1. In a machine for winding a plurality of turns of a flexible member such as wire with uniform spacing on a mandrel, means for rotating the mandrel, a pitch guide having a hole for receiving the mandrel and having a slot extending from the hole to receive a wire, a sensing shoe disposed against the pitch guide with a particular pressure to control the spacing of the turns of wire on the mandrel, and means including servomechanism means for regulating the pressure of the shoe against the pitch guide at the particular pressure.

2. In a machine for winding a plurality of turns of a flexible member such as wire with uniform spacing on a mandrel, means including a pitch guide for applying a constraining force against the wire, means, including servomechanism means, operatively coupled to the constraining means for producing a control signal having characteristics dependent upon variations from a particular value in the constraining force exerted against the wire, means including a motor for varying the relative movement between the mandrel and the wire in accordance with the characteristics of the control signal to regulate at the particular value the force exerted on the wire, and means for adjusting the angular relationship between the wire and the mandrel to produce an adjustment in the spacing of adjacent turns of wire on the mandrel.

3. In a machine for winding a plurality of turns of a flexible member such as wire with uniform spacing on a mandrel, means for rotating the mandrel, a carriage movable along the mandrel, a pitch guide movable along the mandrel to control the minimum pitch of the wire on the mandrel, there being a hole in the pitch guide for the passage of the mandrel therethrough and a slot extending from the hole for the passage of the wire therethrough, a sensing shoe movable with the carriage and disposed against the pitch guide to exert a pressure against the guide for controlling the spacing between turns of wire, and means for controlling the rate of movement of the carriage along the mandrel in accordance with the pressure exerted by the sensing shoe against the pitch guide to maintain the pressure at a particular value.

4. In a machine for winding a plurality of turns of a flexible member such as wire with uniform spacing on a mandrel, a carriage movable in the direction of the mandrel, a sensing shoe carried by the carriage at a position contiguous to the mandrel, a pitch guide positioned on the mandrel for movement along the mandrel and having an opening for receiving the wire to provide a controlled positioning of the wire on the mandrel, means for pressing the sensing shoe against the pitch guide, means operatively coupled to the sensing shoe for producing a signal related to the pressure of the sensing shoe against the pitch guide, and a motor operative in accordance with the signal from the last mentioned means to provide a controlled movement of the carriage along the mandrel at a speed for maintaining the pressure of the sensing shoe against the pitch guide at a regulated value.

5. In a machine for winding a plurality of turns of a flexible member such as wire with uniform spacing on a mandrel, a carriage movable along the mandrel, a sensing shoe movable with the carriage and disposed in contiguous relationship to the mandrel, a pitch guide threaded by the mandrel and having an opening for receiving the wire as it is wound on the mandrel to provide a minimum spacing between turns, pivotable means for pressing the sensing shoe against the pitch guide, means operatively coupled to the sensing shoe for providing a control signal in accordance with the movements of the sensing shoe against the pitch guide, and means for producing a relative movement wtih the carriage and the mandrel in accordance with the control signal to maintain a uniform pressure of the sensing shoe against the pitch guide.

6. In a machine for winding a plurality of turns of a flexible member such as wire with uniform spacing on mandrel, a sensing shoe looping the mandrel and having an opening for the passage of the wire through the sensing shoe to the mandrel, a pitch guide threaded by the mandrel and having a slotted opening for receiving the wire to control the minimum spacing between turns, a pivotable arm extending from the sensing shoe, a spring disposed to pivot the arm in a direction for pressing the sensing shoe against the pitch guide, sensing means controlled by the arm for producing a signal having characteristics dependent upon the pivotable movement of the rod, and a motor for varying the relative movement between the wire and the mandrel in accordance with the signals from the sensing means to regulate the spacing of the turns on the mandrel.

7. In a machine for winding a plurality of turns of wire a flexible member such as wire with uniform spacing on a mandrel, a pitch guide having a slotted opening for threading by the mandrel and by a turn of wire and disposed to exert a force against the wire for controlling the spacing between turns, guide means adjustably positioned to vary the force exerted by the pitch guide on the wire, means including a movable arm for exerting a force against the pitch guide in accordance with the positioning of the movable arm, means for producing a control signal having characteristics dependent upon any variations in the positioning of the movable arm from a particular value, and means including a motor for varying the relative movement between the mandrel and the wire in accordance with the characteristics of the control signal to return the positioning of the movable arm to the particular value.

8. In a machine for winding a plurality of turns of a flexible member such as a wire with uniform spacing on a mandrel, means including a pitch guide for applying a constraining force against the wire at a position contiguous to the mandrel, means for adjusting the angle at which the wire approaches the constraining means to produce corresponding adjustments in the constraining force exerted against the wire, means for producing a control signal representing the polarity and magnitude of the changes in the constraining force from a particular value, and means including a motor for varying the relative movement between the mandrel and the wire in accordance with the characteristics of the control signal to maintain the constraining force at the particular value.

9. In a machine for winding a plurality of turns of a flexible member such as wire with uniform spacing on a mandrel, a carriage movable along the mandrel, a sensing shoe coupled to the carriage and disposed in contiguous relationship to the mandrel, a pitch guide threaded by the mandrel and having an opening for receiving the wire as it is wound on the mandrel to provide a minimum spacing between turns, means for pressing the sensing shoe against the pitch guide, means operatively coupled to the sensing shoe for providing a control signal in accordance with the movements of the sensing shoe against the pitch guide, means for providing a reference signal representing a particular pressure of the sensing shoe against the pitch guide, means for obtaining an output signal representing the difference between the control and reference signals, and means for producing a relative movement between the carriage and the mandrel in accordance with the characteristics of the output signal to maintain the particular pressure of the sensing shoe against the pitch guide.

10. In a machine for winding a plurality of turns of a flexible member such as wire with uniform spacing on a mandrel, a pitch guide for receiving the wire and for applying the wire on the mandrel in a looped configuration, means including a sensing shoe disposed in cooperative relationship with the pitch guide for applying a constraining force against the pitch guide, means operatively coupled to the constraining means for producing a control signal having characteristics related to the constraining force exerted against the pitch guide, means for providing an adjustable reference signal representing a particular constraining force exerted against the pitch guide, means for comparing the control signal and the reference signal to produce an output signal representing any differences between the control and reference signals, and means including a motor for varying the relative movement between the mandrel and the wire in accordance with the characteristics of the output signal to regulate the constraining force exerted on the wire at the particular value.

11. In a machine for winding a plurality of turns of a flexible member such as wire with uniform spacing on a mandrel, means for rotating the mandrel, a pitch guide having a hole for receiving the mandrel and having a slot extending from the hole to receive the wire, a sensing shoe disposed against the pitch guide to exert a constraining force for controlling the spacing of the turns of wire on the mandrel, means including at least one pulley disposed to guide the path of the wire toward the mandrel at a particular angle for the exertion against the wire of a constraining force related to the particular angle, means for adjusting the position of the pulley to provide a corresponding adjustment in the constraining force exerted against the wire, and means including servomechanism means for regulating the constraining force exerted against the wire at a particular value.

References Cited in the file of this patent

UNITED STATES PATENTS

| | | |
|---|---|---|
| 1,140,924 | Underhill | May 25, 1915 |
| 1,994,373 | Thorne | Mar. 12, 1935 |
| 2,146,869 | White | Feb. 14, 1939 |
| 2,209,207 | Reiners et al. | July 23, 1940 |
| 2,341,111 | Menzinger | Feb. 8, 1944 |
| 2,360,960 | Martindell | Oct. 24, 1944 |
| 2,645,429 | Scott et al. | July 14, 1953 |
| 2,668,019 | Holt | Feb. 2, 1954 |

FOREIGN PATENTS

| | | |
|---|---|---|
| 697,711 | Germany | Oct. 21, 1940 |